(12) United States Patent
Huang et al.

(10) Patent No.: US 11,639,578 B2
(45) Date of Patent: May 2, 2023

(54) PRETREATMENT LIQUID FOR WATER-BASED PIGMENT TEXTILE PRINTING AND METHOD FOR FORMING PATTERN ON TEXTILE

(71) Applicant: Everlight Chemical Industrial Corporation, Taipei (TW)

(72) Inventors: Ya-Huang Huang, Taoyuan (TW); Ko-Chou Chen, Taoyuan (TW); Hsiao-San Chen, Taoyuan (TW); Chien-Yi Liao, Taoyuan (TW); Chien-Ming Chen, Taoyuan (TW)

(73) Assignee: EVERLIGHT CHEMICAL INDUSTRIAL CORPORATION, Taipei (TW)

( * ) Notice: Subject to any disclaimer, the term of this patent is extended or adjusted under 35 U.S.C. 154(b) by 17 days.

(21) Appl. No.: 16/845,500

(22) Filed: Apr. 10, 2020

(65) Prior Publication Data

US 2020/0354885 A1    Nov. 12, 2020

(30) Foreign Application Priority Data

May 6, 2019    (TW) ................... 108115480

(51) Int. Cl.

| | |
|---|---|
| *D06M 15/564* | (2006.01) |
| *D06M 11/155* | (2006.01) |
| *D06M 15/61* | (2006.01) |
| *C09D 5/00* | (2006.01) |
| *C09D 175/04* | (2006.01) |
| *D06P 5/00* | (2006.01) |

(52) U.S. Cl.
CPC ............. *D06M 15/564* (2013.01); *C09D 5/00* (2013.01); *C09D 175/04* (2013.01); *D06M 11/155* (2013.01); *D06M 15/61* (2013.01); *D06P 5/001* (2013.01)

(58) Field of Classification Search
CPC .. D06M 15/564; D06M 11/155; D06M 15/61; D06M 5/001; C09D 5/00; C09D 175/04
USPC ....................................................... 524/598
See application file for complete search history.

(56) References Cited

U.S. PATENT DOCUMENTS

| | | | | |
|---|---|---|---|---|
| 6,419,989 B1 * | 7/2002 | Betz | ..................... | C09D 167/00 |
| | | | | 427/388.1 |
| 2007/0093576 A1 * | 4/2007 | Albrecht | ................. | C08K 3/01 |
| | | | | 524/261 |

FOREIGN PATENT DOCUMENTS

| | | | | |
|---|---|---|---|---|
| CN | 101817914 A | | 9/2010 | |
| CN | 104420196 A | | 3/2015 | |
| CN | 104804632 A | * | 7/2015 | ........... C09D 175/04 |
| CN | 106255781 A | | 12/2016 | |
| CN | 106351038 A | | 1/2017 | |
| CN | 107109779 A | | 8/2017 | |
| CN | 108660762 A | | 10/2018 | |
| EP | 2059634 B | | 2/2016 | |
| JP | 2018505970 A | | 3/2018 | |

* cited by examiner

*Primary Examiner* — Kelechi C Egwim

(74) *Attorney, Agent, or Firm* — Bacon & Thomas, PLLC

(57) ABSTRACT

A pretreatment liquid for water-based pigment textile printing is disclosed, which includes: 1 wt % to 30 wt % of aqueous non-ionic polyurethane; 1 wt % to 20 wt % of a metal salt; 0.1 wt % to 10 wt % of a melamine resin; and the balance being a solvent. A method for forming a pattern on a textile using the aforesaid pretreatment liquid is also disclosed.

13 Claims, No Drawings

PRETREATMENT LIQUID FOR WATER-BASED PIGMENT TEXTILE PRINTING AND METHOD FOR FORMING PATTERN ON TEXTILE

CROSS REFERENCE TO RELATED APPLICATION

This application claims the benefits of the Taiwan Patent Application Serial Number 108115480, filed on May 6, 2019, the subject matter of which is incorporated herein by reference.

BACKGROUND

1. Field

The present disclosure relates to a pretreatment liquid for water-based pigment textile printing and a method for forming a pattern on a textile using the same and, more particularly, to a pretreatment liquid for water-based pigment textile printing and a method for forming a pattern on a textile using the same, which increase the fastness of the subsequently applied ink.

2. Description of Related Art

When the pigment-based ink is applied to or sprayed onto dark fabrics or textiles for jet printing, it is necessary to coat the dark fabric with the pretreatment liquid first, and then use the white ink as a primer for increasing the ink fastness or preventing the white ink from penetration. As for the light-colored fabrics, the pretreatment liquid can be applied to the fabric first, such that the chroma of the pigment-based color ink that is subsequently applied or sprayed can be improved.

The conventional pretreatment liquids mostly use an aqueous cationic or aqueous non-ionic resin. However, the pretreatment liquids using an aqueous cationic resin have poor formulation stability and cannot be widely used; while those using an aqueous non-ionic resin have disadvantages of insufficient fastness of ink applied subsequently due to the lack of the cross-linking agent.

Furthermore, in the market, DuPont's white ink system is still the mainstream, and various pretreatment liquid developers adopt the applicability to DuPont products as a standard. However, most of the currently developed pretreatment liquids are not suitable for DuPont white ink systems. The main disadvantage is that the white ink would penetrate, resulting in decreased whiteness or poor performance in fastness. As for the pretreatment liquid developed by DuPont itself, it will crack when used with DuPont white ink system, so there is still room for improvement in friction fastness.

In view of the above, there is an urgent need to develop a pretreatment liquid for water-based pigment textile printing, which can solve the aforementioned problems and increase the fastness of the subsequently applied or sprayed ink.

SUMMARY

An object of the present disclosure is to provide a pretreatment liquid for water-based pigment textile printing, which can increase the fastness of the subsequently coated ink, prevent the penetration of white ink, or enhance the chroma of color ink.

The pretreatment liquid for water-based pigment textile printing of the present disclosure includes 1 wt % to 30 wt % of aqueous non-ionic polyurethane; 1 wt % to 20 wt % of a metal salt; 0.1 wt % to 10 wt % of a melamine resin; and the balance being a solvent.

The pretreatment liquid of the present disclosure is a pretreatment liquid for water-based pigment textile printing. In the pretreatment liquid of the present disclosure, in addition to including the aqueous non-ionic polyurethane, it is also used in combination with the melamine resin acting as a cross-linking agent, which can make the subsequently coated ink exhibit good fastness characteristics. At the same time, when the subsequently applied ink is a white ink, it can further exhibit good whiteness; and when the subsequently applied ink is a color ink, it can exhibit good color uniformity.

The pretreatment liquid of the present disclosure may include 1 wt % to 30 wt % of aqueous non-ionic polyurethane. Preferably, the pretreatment liquid of the present disclosure includes 1 wt % to 20 wt % of aqueous non-ionic polyurethane. More preferably, the pretreatment liquid of the present disclosure includes 5 wt % to 15 wt % of aqueous non-ionic polyurethane. Most preferably, the pretreatment liquid of the present disclosure includes 8 wt % to 12 wt % of aqueous non-ionic polyurethane. In an embodiment of the present disclosure, the pretreatment liquid includes about 10 wt % of aqueous non-ionic polyurethane.

In the pretreatment liquid of the present disclosure, the aqueous non-ionic polyurethane is water-dispersible non-ionic polyurethane. Preferably, the aqueous non-ionic polyurethane is a polyol polyurethane water-based resin, which is a polyurethane water-based resin polymerized by a polyol and a polyisocyanate. More preferably, the aqueous non-ionic polyurethane is a hydrophilic polyol polyurethane water-based resin. Most preferably, the aqueous non-ionic polyurethane is a highly hydrophilic polyol polyurethane water-based resin.

The pretreatment liquid of the present disclosure may include 1 wt % to 20 wt % of a metal salt. Preferably, the pretreatment liquid of the present disclosure includes 5 wt % to 15 wt % of the metal salt. More preferably, the pretreatment liquid of the present disclosure includes 8 wt % to 12 wt % of the metal salt. In an embodiment of the present disclosure, the pretreatment liquid includes about 10 wt % of the metal salt.

In the pretreatment liquid of the present disclosure, the metal salt is not particularly limited, and may be a polyvalent metal salt, for example, a divalent, trivalent, or tetravalent metal salt. For example, the metal salt may be a metal salt including Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn or Pb. In an embodiment of the present disclosure, the metal salt is a metal salt including Mg, Ca, Ba, Ru, Co, Zn, Al, or Ga. In another embodiment of the present disclosure, the metal salt is a metal salt including Ca. In still another embodiment of the present disclosure, the metal salt is calcium chloride, calcium nitrate, calcium nitrate hydrate, or a combination thereof. In a further embodiment of the present disclosure, the metal salt is calcium chloride. Herein, the aforementioned metal salts can be used alone or in combination. By using the pretreatment liquid containing the metal salt, the white ink or color ink that is subsequently applied to the textile can be condensed to form a white ink film or color ink film.

The pretreatment liquid of the present disclosure may include 0.1 wt % to 10 wt % of a melamine resin, which serves as a cross-linking agent. Preferably, the pretreatment liquid of the present disclosure includes 0.1 wt % to 5 wt % of the melamine resin. More preferably, the pretreatment liquid of the present disclosure includes 0.1 wt % to 3 wt % of the melamine resin. Most preferably, the pretreatment liquid of the present disclosure includes 0.3 wt % to 1.5 wt % of the melamine resin. In an embodiment of the present disclosure, the pretreatment liquid includes about 0.6 wt % of the melamine resin. In another embodiment of the present disclosure, the pretreatment liquid includes about 1.0 wt % of the melamine resin. In still another embodiment of the present disclosure, the pretreatment liquid includes about 1.2 wt % of the melamine resin.

In the pretreatment liquid of the present disclosure, the melamine resin may be a methyl-etherified high-imino melamine resin, and specific examples thereof include Cymel 327 or Cymel 385. In the pretreatment liquid of the present disclosure, the melamine resin may also be a high-methyl-etherified melamine resin, and specific examples thereof include Cymel 303 or Cymel 350. Herein, the examplified melamine resins described above may be used alone or in combination.

The pretreatment liquid of the present disclosure may further include 0.01 wt % to 2 wt % of a wetting agent. The pretreatment liquid of the present disclosure includes preferably 0.01 wt % to 1 wt % of the wetting agent and more preferably 0.1 wt % to 0.5 wt % of the wetting agent. In an embodiment of the present disclosure, the pretreatment liquid includes about 0.3 wt % of the wetting agent.

Herein, the types of the wetting agent include the polyether-modified siloxane wetting agent (e.g., BYK348 and Silwet L-7280), or the non-ionic wetting agent without siloxane (e.g., Surfynol® 465).

In the pretreatment liquid of the present disclosure, the solvent used is water.

In addition to the pretreatment liquid described above, the present disclosure further provides a method for forming a pattern on a textile using the pretreatment liquid described above. The method includes the steps of providing a textile and the pretreatment liquid for water-based pigment textile printing set forth above; applying the pretreatment liquid to a predetermined region of the textile and proceeding with high temperature curing; and coating the predetermined region with a white paste or a color paste to form a white pattern or a color pattern.

In the method of the present disclosure, the textile may be a dark fabric or a light-colored fabric. Specific examples of the type of fabric include, but are not limited to, cotton, linen, woolen fabric, silk fabric, chemical fiber fabric, nylon fabric, non-woven fabric, and the like.

Moreover, in the method of the present disclosure, the high temperature curing of the pretreatment liquid may be carried out between 130° C. and 165° C. Through the high temperature curing, the crosslinked aqueous non-ionic polyurethane can have higher strength of crosslinking.

Other objects, advantages, and novel features of the disclosure will become more apparent from the following detailed description when taken in conjunction with the accompanying drawings.

DETAILED DESCRIPTION OF THE EMBODIMENT

The following embodiments when read with the accompanying drawings are made to clearly exhibit the above-mentioned and other technical contents, features and/or effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Unless specified otherwise, singular word "a" or "the" used in the present specification and claims includes one or plural referents.

Unless specified otherwise, term "or" used in the present specification and claims includes meaning of "and/or".

Test Example 1

In the following examples and comparative examples of the present disclosure, the pretreatment liquids for water-based pigment textile printing of Examples 1 to 4 and Comparative Examples 1 to 5 were prepared according to the formulations in Table 1 below.

TABLE 1

|  | Comparative Example 1 | Comparative Example 2 | Comparative Example 3 | Comparative Example 4 | Comparative Example 5 | Example 1 | Example 2 | Example 3 | Example 4 |
|---|---|---|---|---|---|---|---|---|---|
| Non-ionic polyurethane Permax ™ 232) | — | — | — |  |  | 10% |  |  |  |
| Non-ionic polymer Printrite ™ 300 | 10% | 5% | — |  |  | — |  |  |  |
| Styrene/acrylic copolymer (Mowinyl 6730) | — | — | 10% |  |  | — |  |  |  |
| Calcium chloride | — | 5% | — |  |  | 10% |  |  |  |
| Calcium nitrate tetrahydrate | 15% | — | 15% |  |  | — |  |  |  |
| Cross-linking agent Cymel 303 | — | — | — | — | — | 0.6% | — | — | — |
| Cross-linking agent Cymel 327 | — | — | — | — | — | — | 1% | — | — |
| Cross-linking agent Cymel 350 | — | — | — | — | — | — | — | 1% | — |
| Cross-linking agent Cymel 385 | — | — | — | — | — | — | — | — | 1.2% |
| Cross-linking agent PVA (1%) | — | — | 8% | — | 8% |  | — |  |  |

TABLE 1-continued

| | Comparative Example 1 | Comparative Example 2 | Comparative Example 3 | Comparative Example 4 | Comparative Example 5 | Example 1 | Example 2 | Example 3 | Example 4 |
|---|---|---|---|---|---|---|---|---|---|
| Wetting agent BYK347 | — | 0.03% | — | — | — | | — | | |
| Wetting agent BYK348 | — | — | 0.1% | — | — | | — | | |
| Wetting agent Silwet L-7280 | — | — | — | — | 0.3% | | | | |
| Water | | | | The balance | | | | | |

The prepared pretreatment liquids of Examples 1 to 4 and Comparative Examples 1 to 5 were applied manually or automatically to a 3/1 black cotton twill, and then subjected to high temperature curing between 130° C. and 165° C. and drying. Afterwards, the white ink (DuPont™ Artistri P5910 White DTG Ink) was sprayed onto the area coated with the pretreatment liquid by the APEX direct printing machine (EPSON DX5). The whiteness test, dry friction fastness test, wet friction fastness test and washing fastness test were performed after drying and color fixation.

Whiteness Test

The 3/1 black cotton twill coated with the white ink was subjected to Datacolor 400 color measurement. The color measurement data was the CIE whiteness value, and the light source was D65.

Dry Friction Fastness Test (AATCC8)

The "dry" black twill (same as the scratch cloth, 3/1 black cotton twill) was rubbed on the cloth printed with white ink back and forth for ten times. The rating is a comprehensive evaluation of both pollution (black cloth) and discoloration.

Wet Friction Fastness Test (AATCC8)

The "wet" black twill (the same as the scratch cloth, 3/1 black cotton twill) (being immersed in water to get wet, and then dried in a dehydrator for 2 minutes) was rubbed on the cloth printed with white ink back and forth for ten times. The rating is a comprehensive evaluation of both pollution (black cloth) and discoloration.

Washing Fastness Test (AATCC3A)

The formulation and steps for washing fastness test are as what follows:
  a) formulation of the soaping agent: 100 g $H_2O$ +0.15 g WOB.
  b) putting a cloth (5 cm×15 cm) and 106.7 g of steel beads (approximately 100 pieces) in each steel bottle, and adding 50 g of the aqueous soaping agent; washing at 70° C. for 45 minutes; and then washing the cloth clean and drying in an oven at 60° C.

The test results of the whiteness test, dry friction fastness test, wet friction fastness test and washing fastness test were listed in Table 2 below.

TABLE 2

| | Comparative Example 1 | Comparative Example 2 | Comparative Example 3 | Comparative Example 4 | Comparative Example 5 | Example 1 | Example 2 | Example 3 | Example 4 |
|---|---|---|---|---|---|---|---|---|---|
| Whiteness (coating test) | CIE W >80 | CIE W >80 | CIE W >80 | | | CIE W >80 | | | |
| Dry friction fastness (AATCC8) | 1-2 | 2 | 2 | 1-2 | 3-4 | 3-4 | 3-4 | 3-4 | 3-4 |
| Wet friction fastness (ANTCC8) | 1-2 | 2 | 2 | 1-2 | 3-4 | 4 | 4 | 4 | 4 |
| Washing fastness (AATCC3A) | 1 | 1-2 | 1-2 | 1 | 1 | 5 | 4-5 | 4 | 3-4 |

As shown in the results of Table 2 above, the pretreatment liquids of Comparative Examples 1 to 4 did not perform well on those fastness tests. Although the pretreatment liquid of Comparative Example 5 exhibited better dry friction fastness and wet friction fastness due to the use of a PVA cross-linking agent, the washing fastness was still not good. In contrast, the pretreatment liquids of Examples 1 to 4, when using the melamine resin as the cross-linking agent, can exhibit higher strength of crosslinking under high temperature curing (between 130° C. and 165° C.). It has excellent performance in not only whiteness but also the fastness tests, including washing fastness, dry friction fastness and wet friction fastness.

Test Example 2

In this test example, the pretreatment liquid of Example 3 prepared in Test Example 1 and the DuPont pretreatment liquid P5100 were used for testing. In this test example, the jet printing conditions are the same as those described in Test Example 1, and will not be described again. The test results of the dry friction fastness test, wet friction fastness test and washing fastness test are listed in Table 3 below.

TABLE 3

| | White ink DuPont ™ Artistri P5910 White DTG Ink. Pretreatment liquid | |
|---|---|---|
| | P5100 (DuPont) | Example 3 |
| Dry friction fastness (AATCC8) | 3 | 3-4 |
| Wet friction fastness (AATCC8) | 3-4 | 4 |
| Washing fastness (AATCC3A) | 4 | 4-5 |

As shown in the results of Table 3 above, when the pretreatment liquid of Example 3 is used with DuPont ink, not only the whiteness is good, but also a sharper printed image can be obtained, and the fastness tests also performed better, compared with the DuPont pretreatment liquid.

Test Example 3

In this test example, the pretreatment liquid of Example 3 prepared in Test Example 1 and the DuPont pretreatment liquid P5100 were used for testing. In this test example, the jet printing conditions were the same as those described in Test Example 1, except that DuPont ink was used in Test Example 1, whereas the white ink shown in Table 6 of Taiwan Patent Application No. 107115631 was used in this test example. The test results of the dry friction fastness test, wet friction fastness test and washing fastness test are listed in Table 4 below.

TABLE 4

| | Pretreatment liquid | |
| --- | --- | --- |
| | Example 3 | P5100 (DuPont) |
| | White ink | |
| | The white ink of Taiwan Patent Application No. 107115631 | DuPont ™ Artistri P5910 White DTG Ink. |
| Dry friction fastness (AATCC8) | 5 | 3 |
| Wet friction fastness (AATCC8) | 4-5 | 3-4 |
| Washing fastness (AATCC3A) | 4 | 4 |

As shown in the results of Table 4 above, when the pretreatment liquid of Example 3 is used with the white ink of Taiwan Patent Application No. 107115631, all the dry friction fastness test, wet friction fastness test, and washing fastness test have grade 4-5 performance.

Test Example 4

In this test example, the pretreatment liquid of Example 3 prepared in Test Example 1 was used for testing. In this test example, the jet printing conditions are the same as those described in Test Example 1, except that Test Example 1 used 3/1 black cotton twill and DuPont white ink, whereas this test example used 3/1 white cotton twill and color ink DuPont P5910 Series.

In this test example, after thermal curing, the difference in color strength was compared between the pigment-based inks formed using pretreatment liquid of Example 3 or not. Herein, the Integ value of the sample without the pretreatment liquid was set to 100%. The test results are listed in Table 5 below.

TABLE 5

| Pretreatment liquid of Example 3 | Integ value |
| --- | --- |
| Yellow | 103.11 |
| Magenta | 110.19 |
| Cyan | 109.67 |
| Black | 115.70 |

As shown in the results of Table 5 above, after the pigment-based ink was thermally cured, the Integ value was increased with the use of the pretreatment liquid of Example 3, which meant an increase in color strength. Simultaneously, under the use of the pretreatment liquid of Example 3, the pigment-based ink and fabrics had good fastness characteristics and color uniformity.

In summary, when the pretreatment liquid for water-based pigment textile printing of the present disclosure is applied to dark fabrics, the ink fastness of white ink can be improved and the penetration of white ink can be prevented. In addition, when the pretreatment liquid for water-based pigment textile printing of the present disclosure is used on light-colored fabrics, the chroma and color uniformity of the pigment-based color ink can be improved.

Although the present disclosure has been explained in relation to its preferred embodiment, it is to be understood that many other possible modifications and variations can be made without departing from the spirit and scope of the disclosure as hereinafter claimed.

What is claimed is:

1. A pretreatment liquid for water-based pigment textile printing, comprising:
   1 wt % to 30 wt % of aqueous non-ionic polyurethane;
   1 wt % to 20 wt % of calcium chloride;
   0.1 wt % to 10 wt % of a melamine resin; and
   a solvent.

2. The pretreatment liquid of claim 1, further comprising 0.01 wt % to 2 wt % of a wetting agent.

3. The pretreatment liquid of claim 1, wherein the aqueous non-ionic polyurethane is a polyol polyurethane water-based resin.

4. The pretreatment liquid of claim 1, wherein the melamine resin is a methyl-etherified high-imino melamine resin.

5. The pretreatment liquid of claim 1, wherein the melamine resin is a high-methyl-etherified melamine resin.

6. The pretreatment liquid of claim 1, wherein the solvent is water.

7. A method for forming a pattern on a textile, comprising:
   providing a textile and a pretreatment liquid for water-based pigment textile printing, wherein the pretreatment liquid comprises:
   1 wt % to 30 wt % of aqueous non-ionic polyurethane;
   1 wt % to 20 wt % of calcium chloride;
   0.1 wt % to 10 wt % of a melamine resin; and
   a solvent;
   applying the pretreatment liquid to a predetermined region of the textile and proceeding with high temperature curing; and
   coating the predetermined region with a white paste or a color paste to form a white pattern or a color pattern.

8. The method of claim 7, wherein the high temperature curing is carried out between 130° C. and 165° C.

9. The method of claim 7, wherein the pretreatment liquid further comprises 0.01 wt % to 2 wt % of a wetting agent.

10. The method of claim 7, wherein the aqueous non-ionic polyurethane is a polyol polyurethane water-based resin.

11. The method of claim 7, wherein the melamine resin is a methyl-etherified high-imino melamine resin.

12. The method of claim 7, wherein the melamine resin is a high-methyl-etherified melamine resin.

13. The method of claim 7, wherein the solvent is water.

* * * * *